US010516315B2

(12) United States Patent
Furuuchi et al.

(10) Patent No.: US 10,516,315 B2
(45) Date of Patent: Dec. 24, 2019

(54) DRIVE DEVICE AND VENTILATION MEMBER

(71) Applicant: NITTO DENKO CORPORATION, Ibaraki-shi, Osaka (JP)

(72) Inventors: Koji Furuuchi, Ibaraki (JP); Toshiaki Masaki, Ibaraki (JP); Ryoichi Matsushima, Ibaraki (JP); Hideki Hayama, Ibaraki (JP); Takahisa Kusuura, Tokyo (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 291 days.

(21) Appl. No.: 15/528,469

(22) PCT Filed: Nov. 19, 2015

(86) PCT No.: PCT/JP2015/082568
§ 371 (c)(1),
(2) Date: May 19, 2017

(87) PCT Pub. No.: WO2016/080494
PCT Pub. Date: May 26, 2016

(65) Prior Publication Data
US 2017/0324297 A1 Nov. 9, 2017

(30) Foreign Application Priority Data
Nov. 19, 2014 (JP) .................................. 2014-234903

(51) Int. Cl.
*H02K 5/10* (2006.01)
*B01D 71/36* (2006.01)
(Continued)

(52) U.S. Cl.
CPC ............... *H02K 5/10* (2013.01); *B01D 71/36* (2013.01); *B60K 7/0007* (2013.01); *H02K 9/02* (2013.01); *B60K 2007/0092* (2013.01)

(58) Field of Classification Search
CPC ... H02K 5/10; H02K 9/02; H02K 7/14; B60K 11/06; B60K 11/08; B60K 7/0007;
(Continued)

(56) References Cited

U.S. PATENT DOCUMENTS 2,506,146 A * 5/1950 Gladish ................ B60K 7/0007
310/67 R
3,035,652 A * 5/1962 McLean ............... B60K 7/0007
180/10

(Continued)

FOREIGN PATENT DOCUMENTS

CN 1459392 A 12/2003
CN 203438835 U 2/2014
(Continued)

OTHER PUBLICATIONS

Oct. 31, 2018 Extended European Search Report issued in European Patent Application No. 15860099.9.
(Continued)

*Primary Examiner* — Mohamad A Musleh
(74) *Attorney, Agent, or Firm* — Oliff PLC (57) ABSTRACT

A drive device includes: a rotor and a stator; a case housing the rotor and the stator; a brake rotor that is arranged on the outside of the case and rotates in conjunction with the rotation of the rotor; a brake caliper that stops the rotation of the brake rotor by coming in contact with the brake rotor; and a ventilation membrane that is attached to the case, stops fluid or solids from penetrating inside the case from outside the case and also has formed therein multiple pores that permit gas to flow between inside and outside. The case has
(Continued)

an output part that supports the rotor and a stator holding part that supports the stator. The ventilation membrane is attached to the stator holding part.

9 Claims, 5 Drawing Sheets

(51) Int. Cl.
*B60K 7/00* (2006.01)
*H02K 9/02* (2006.01)

(58) Field of Classification Search
CPC .............. B60K 7/00; B60K 2007/0038; B60K 2001/006; B60K 2007/0092; B01D 71/36; B60L 15/00
See application file for complete search history.

(56) References Cited

U.S. PATENT DOCUMENTS

| | | | | |
|---|---|---|---|---|
| 3,161,249 A * | 12/1964 | Paul | ............ | B60K 7/0007 180/10 |
| 5,798,589 A * | 8/1998 | Ohi | ............ | F16C 23/04 310/90 |
| 6,199,652 B1 * | 3/2001 | Mastroianni | ......... | B60K 7/0007 180/229 |
| 6,355,996 B1 * | 3/2002 | Birkestrand | ........... | B62K 23/04 310/54 |
| 2003/0216119 A1 | 11/2003 | Mashiko et al. | | |
| 2003/0220067 A1 | 11/2003 | Mashiko et al. | | |
| 2007/0257570 A1 * | 11/2007 | Walter | ................ | B60K 7/0007 310/67 R |
| 2010/0227544 A1 | 9/2010 | Furuyama et al. | | |
| 2011/0011203 A1 * | 1/2011 | Yamamoto | ........... | B60K 7/0007 74/606 A |
| 2012/0001521 A1 * | 1/2012 | Shiraki | ............... | B60K 7/0007 310/67 R |
| 2012/0161498 A1 * | 6/2012 | Hansen | ................ | B60K 7/0007 301/6.5 |
| 2017/0156228 A1 | 6/2017 | Uemura et al. | | |

FOREIGN PATENT DOCUMENTS

| | | |
|---|---|---|
| CN | 103887945 A | 6/2014 |
| CN | 106416444 A | 2/2017 |
| EP | 1363069 A2 | 11/2003 |
| EP | 1970258 A1 | 9/2008 |
| JP | 2007-182194 A | 7/2007 |
| JP | 2007-282720 A | 11/2007 |
| JP | 2012-230983 A | 11/2012 |
| JP | 2014-083948 A | 5/2014 |

OTHER PUBLICATIONS

Feb. 16, 2016 International Search Report issued in International Patent Application No. PCT/JP2015/082568.

* cited by examiner

DRIVE DEVICE AND VENTILATION MEMBER

TECHNICAL FIELD

The present invention relates to a drive device and a ventilation member.

BACKGROUND ART

In recent years, techniques for suppressing penetration of fluid, such as water, or solids, such as dust, into inside of an in-wheel motor mounted to a vehicle have been suggested.

For example, an in-wheel motor described in Patent Document 1 is configured as follows. That is, an inner case of a hollow shape is supported by a vehicle through a suspension device. A stator is fitted to an outer periphery of the inner case. A cylindrical outer case is fixed to a rotatably supported hub and is positioned on the outer periphery of the inner case. A permanent magnet is fitted to an inner periphery of the outer case through a gap so as to be opposed to the stator to constitute a rotor. The outer peripheries of the stator and the rotor are covered by an inner case cover and an outer case cover, respectively. A labyrinth structure is formed by the inner case and the outer case on a portion communicating with a gap between the rotor and the stator.

CITATION LIST

Patent Literature

Patent Document 1: Japanese Patent Application Laid-Open Publication No. 2007-182194

SUMMARY OF INVENTION

Technical Problem

Even though the labyrinth structure is formed by the inner case and the outer case on the portion communicating with the gap between the rotor and the stator as in the in-wheel motor described in Patent Document 1, if the gap between the inner case and the outer case is of a size capable of passing fluid or solids, there is a sufficient possibility that the fluid or solids penetrate into inside of a case.

An object of the present invention is to provide a drive device and a ventilation member capable of suppressing penetration of fluid or solids from outside to inside of a case more accurately.

Solution to Problem

Under such an object, the present invention is a drive device (1) including: a rotor (110) and a stator (120) of a motor; a case (130) that contains the rotor (110) and the stator (120); a rotating plate (31) that is disposed outside of the case (130) and rotates in conjunction with rotation of the rotor (110); a stopping member (32) that stops the rotation of the rotating plate (31) by contacting the rotating plate (31); and a ventilation body (210) that is attached to the case (130) and includes multiple pores formed therein to prevent a fluid and a solid from penetrating inside of the case (130) from outside of the case (130) and to permit flow of a gas between the inside and the outside, wherein the case (130) includes a rotating-side case (140) that supports the rotor (110) and a fastening-side case (150) that supports the stator (120), and the ventilation body (210) is attached to the fastening-side case (150).

Here, the ventilation body (210) may be attached to an opposite side of the stopping member (32) with respect to a rotation shaft of the rotor (110).

From another standpoint, the present invention is a drive device (1) including: a heat generation body (110, 120) that generates heat by operating; a case (130) that contains the heat generation body (110, 120); and a ventilation body (210) that is attached to the case (130) and includes multiple pores formed therein to prevent a fluid and a solid from penetrating inside of the case (130) from outside of the case (130) and to permit flow of a gas between the inside and the outside.

Here, the ventilation body (210) may be a polytetrafluoroethylene porous membrane.

Moreover, the drive device (1) may further include a protection member (240) that is disposed outside of the ventilation body (210) and prevents a solid from reaching the ventilation body (210), the solid moving from the outside of the case (130) toward the inside of the case (130).

From another standpoint, the present invention is a ventilation member (200) including: a ventilation body (210) that includes multiple pores formed therein to prevent a fluid and a solid from penetrating inside of a case (130) from outside of the case (130) and to permit flow of a gas between the inside and the outside, the case (130) containing a heat generation body (110, 120) that generates heat by operating; and an attachment part (220) that attaches the ventilation body (210) to the case (130).

Here, the ventilation body (210) may be a polytetrafluoroethylene porous membrane.

Moreover, the ventilation member (200) may further include a protection member (240) that is disposed outside of the ventilation body (210) and prevents a solid from reaching the ventilation body (210), the solid moving from the outside of the case (130) toward the inside of the case (130).

Moreover, the ventilation member (200) may further include a covering member (230) that is provided around the ventilation body (210) to form a ventilation path to permit flow of a gas between the ventilation body (210) and the covering member (230), wherein the protection member (240) may be disposed between the ventilation body (210) and the covering member (230).

Here, the protection member (240) may be in a mesh shape or a fiber shape.

Advantageous Effects of Invention

According to the present invention, it is possible to suppress penetration of fluid or solids from outside to inside of a case more accurately.

DESCRIPTION OF EMBODIMENTS

Hereinafter, an exemplary embodiment according to the present invention will be described in detail with reference to attached drawings.

Figure 1:
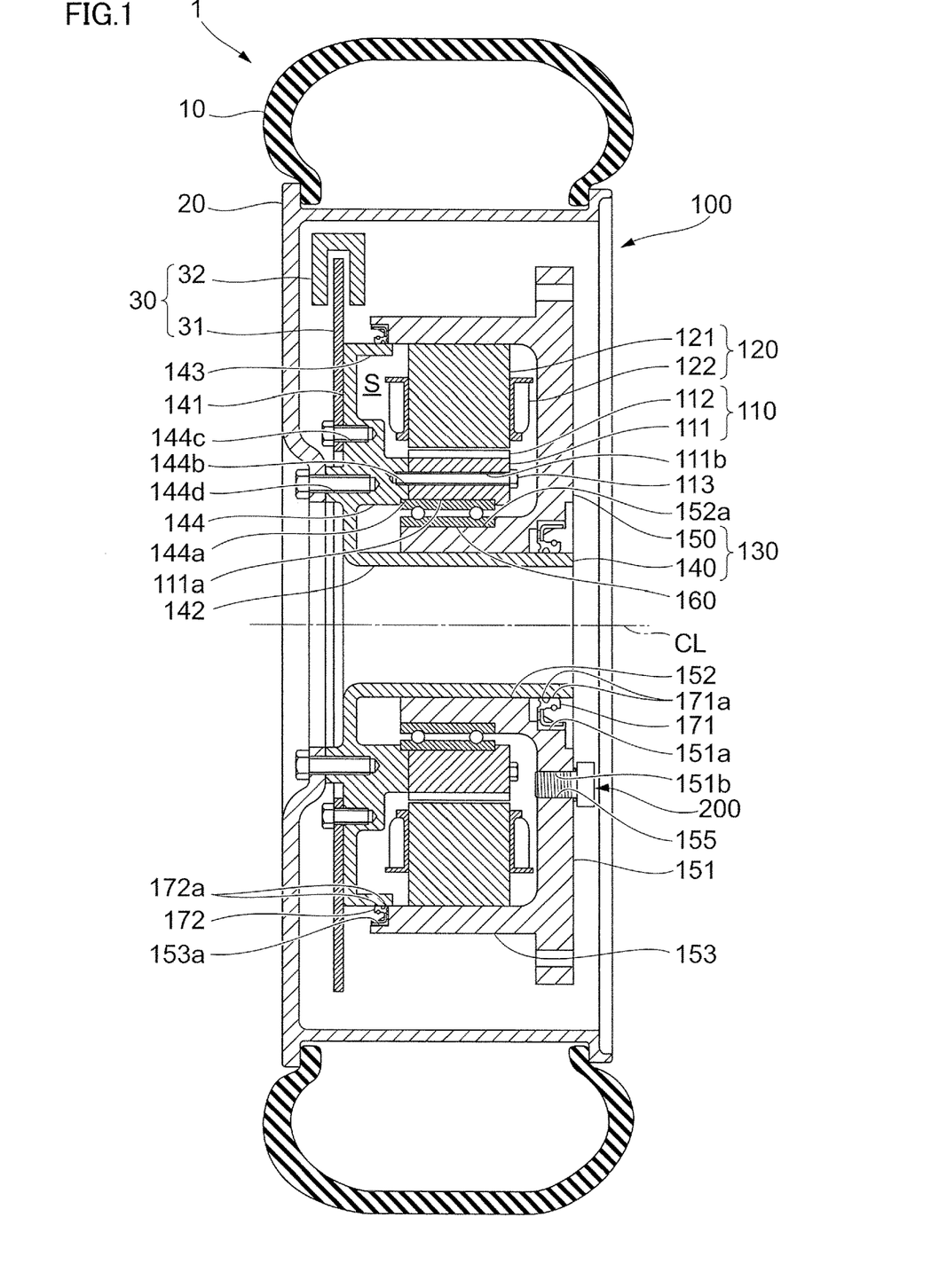
FIG. 1 is a diagram showing a general configuration of a wheel drive device related to an exemplary embodiment.

FIG. 1 is a diagram showing a general configuration of a wheel drive device 1 related to the exemplary embodiment.

The wheel drive device 1 is a device adopting a so-called in-wheel motor system that is applied to, for example, an electric vehicle, and has an electric motor for each wheel.

The wheel drive device 1 includes: a tire 10; a wheel 20 to which the tire 10 is attached; an in-wheel motor 100 arranged on an inner periphery side of the wheel 20 (hereinafter, in some cases, simply referred to as "motor 100"); and a brake device 30 that stops rotation of the tire 10.

The brake device 30 includes: a brake rotor 31 as an example of a disc-shaped rotating plate attached to an output part 140, which will be described later, of the motor 100; and a brake caliper 32 as an example of a stopping member that makes it possible to perform braking by friction due to pressing a built-in brake pad against the brake rotor 31.

<Configuration of Motor 100>

Hereinafter, the motor 100 will be described in detail.

The motor 100 includes: a rotor 110 that rotates; and a stator 120 that generates a rotational moment by interacting with the rotor 110. Moreover, the motor 100 includes a case 130 that contains the rotor 110 and the stator 120. The case 130 includes: the output part 140 that holds the rotor 110 and rotates around a shaft center CL with the rotor 110 to thereby output power; and a stator holding part 150 that holds the stator 120 and is attached to a body of a vehicle.

Moreover, the motor 100 includes a bearing 160 disposed between the rotor 110 or the output part 140, which are the members of a rotation side, and the stator holding part 150, which is the member of a fixed side. The bearing 160 can be illustrated as a ball bearing or a roller bearing.

Moreover, the motor 100 includes, between the output part 140 and the stator holding part 150, an inner-diameter-side oil seal 171 disposed on an inner diameter side (the shaft center CL side) and an outer-diameter-side oil seal 172 disposed on an outer diameter side.

Moreover, the motor 100 includes a ventilation member 200 that prevents fluid or solids from penetrating into the inside of the case 130 from the outside of the case 130 and permits flow of gas between the inside of the case 130 and the outside of the case 130.

[Configuration of Rotor 110]

The rotor 110 includes multiple magnetic steel sheets 111 that are fastened to the output part 140 and laminated, and multiple permanent magnets 112 fastened to outer peripheries of the magnetic steel sheets 111. The multiple magnetic steel sheets 111 and the multiple permanent magnets 112 are configured to have cylindrical shapes.

On the inner diameter side (the shaft center CL side) of the magnetic steel sheets 111, a concave part 111a recessed from an inner circumferential surface is annularly formed. The bearing 160 is fitted into the concave part 111a.

The rotor 110 configured as descried above is fastened to the output part 140 as will be described later.

[Configuration of Stator 120]

The stator 120 includes an iron core 121 formed by laminated magnetic steel sheets and a coil 122 wound around each teeth part formed on the iron core 121. The iron core 121 is configured to have a cylindrical shape.

Wiring (not shown) for supplying electric power from an electric power supply is connected to the stator 120.

The stator 120 configured as descried above is fastened to the stator holding part 150 as will be described later.

[Configuration of Output Part 140]

The output part 140 includes: an output-side disk-shaped part 141 substantially in a disk-like shape with an opening portion at a center portion around the shaft center CL; and an output inner-diameter-side protrusion part 142 substantially in a cylindrical shape that protrudes from an end portion on an inner diameter side (the shaft center CL side) in the output-side disk-shaped part 141 toward a direction of the shaft center CL. Moreover, the output part 140 includes: an output outer-diameter-side protrusion part 143 substantially in a cylindrical shape that protrudes from an end portion on an outer diameter side in the output-side disk-shaped part 141 toward the direction of the shaft center CL; and a central protrusion part 144 substantially in a cylindrical shape that protrudes from the center portion in a radial direction in the output-side disk-shaped part 141 toward the direction of the shaft center CL. The central protrusion part 144 is disposed between the output inner-diameter-side protrusion part 142 and the output outer-diameter-side protrusion part 143 in the radial direction.

On the inner diameter side (the shaft center CL side) of a tip end portion in the central protrusion part 144, a concave part 144a recessed from a tip end surface is annularly formed. Moreover, on the tip end portion in the central protrusion part 144, multiple female threads 144b are formed in the circumferential direction. The rotor 110 is fastened to the output part 140 by tightening up bolts 113 inserted into through holes 111b formed in the magnetic steel sheets 111 in the shaft direction by the female threads 144b. Then, the output part 140 and the rotor 110 holds the bearing 160 by sandwiching the bearing 160 in the direction of the shaft center CL between the concave part 144a formed in the central protrusion part 144 of the output part 140 and the concave part 111a formed in the magnetic steel sheets 111 of the rotor 110.

Moreover, at an outside portion in the central protrusion part 144, a female thread 144c for attaching a brake rotor 31 and a female thread 144d for attaching the wheel 20 are formed.

[Configuration of Stator Holding Part 150]

The stator holding part 150 includes: a holding-side disk-shaped part 151 substantially in a disk-like shape with an opening at a center portion around the shaft center CL; and a holding inner-diameter-side protrusion part 152 substantially in a cylindrical shape that protrudes from an end portion on an inner diameter side (the shaft center CL side) in the holding-side disk-shaped part 151 toward a direction of the shaft center CL. Moreover, the stator holding part 150 includes a holding outer-diameter-side protrusion part 153 substantially in a cylindrical shape that protrudes from an end portion on an outer diameter side in the holding-side disk-shaped part 151 toward the direction of the shaft center CL.

On an outer circumferential surface of the holding inner-diameter-side protrusion part 152, a concave part 152a recessed from the outer circumferential surface is annularly formed. The bearing 160 is fitted into the concave part 152a by close fit.

The stator 120 is attached to an inner circumferential surface in the holding outer-diameter-side protrusion part 153. As a method of attaching the stator 120 to the holding outer-diameter-side protrusion part 153, methods such as a method of fitting by close fit, a method of joining by use of a bonding agent and a method of clamping by a clamping member, such as a bolt, can be taken as examples.

At the inner diameter side (the shaft center CL side) portion in the holding-side disk-shaped part 151, a through hole 151*b* in the direction of the shaft center CL is formed, and a female thread 155 into which the ventilation member 200 is tightened is formed on a surface of the through hole 151*b*.

On a surface of on a side (an outer side), where the holding inner-diameter-side protrusion part 152 does not protrude, in the end portion on the inner diameter side (the shaft center CL side) of the holding-side disk-shaped part 151, a holding inner-diameter-side concave part 151*a* recessed from the surface is annularly formed. The inner-diameter-side oil seal 171 is fitted into the holding inner-diameter-side concave part 151*a*. The inner-diameter-side oil seal 171 can be exemplified as an oil seal that has multiple lip parts 171*a* made of an elastic material, such as rubber or resin material, in part of a cored bar made of metal, such as a steel plate, and is provided with a spring for increasing a seal pressure of the lip parts 171*a*. Then, a gap between the inner circumferential surface of the holding inner-diameter-side protrusion part 152 of the stator holding part 150 and the outer circumferential surface of the output inner-diameter-side protrusion part 142 is sealed by the lip parts 171*a* of the inner-diameter-side oil seal 171 contacting the outer circumferential surface of the output inner-diameter-side protrusion part 142 in the output part 140.

On the inner diameter side (the shaft center CL side) of a tip end portion of the holding outer-diameter-side protrusion part 153, a holding outer-diameter-side concave part 153*a* recessed from a tip end surface is annularly formed. The outer-diameter-side oil seal 172 is fitted into the holding outer-diameter-side concave part 153*a*. Similar to the inner-diameter-side oil seal 171, the outer-diameter-side oil seal 172 can be exemplified as an oil seal that has multiple lip parts 172*a* made of an elastic material in part of the cored bar made of metal and is provided with a spring for increasing a seal pressure of the lip parts 172*a*. Then, a gap between the inner circumferential surface of the holding outer-diameter-side protrusion part 153 of the stator holding part 150 and the outer circumferential surface of the output outer-diameter-side protrusion part 143 is sealed by the lip parts 172*a* of the outer-diameter-side oil seal 172 contacting the outer circumferential surface of the output outer-diameter-side protrusion part 143 in the output part 140.

Then, the wheel drive device 1 is mounted to the vehicle body by attaching the stator holding part 150 to the vehicle body.

The case 130 including the output part 140 and the stator holding part 150 configured as described above contains the rotor 110 and the stator 120 in an inside space S formed between the output part 140 and the stator holding part 150. In other words, the case 130 functions as a case that contains the rotor 110 and the stator 120, as an example of a heat generation body that generates heat by energization of the coil 122 of the stator 120 when the motor 100 operates. Then, of the output part 140 and the stator holding part 150 that constitute the case 130, the output part 140 functions as a rotating-side case that supports the rotor 110 and the stator holding part 150 functions as the fastening-side case that supports the stator 120.

Then, the inside space S of the case 130 is sealed by the inner-diameter-side oil seal 171 and the outer-diameter-side oil seal 172. In other words, a gap between the output inner-diameter-side protrusion part 142 of the output part 140 and the holding inner-diameter-side protrusion part 152 of the stator holding part 150 on the inner diameter side (the shaft center CL side) is sealed by the inner-diameter-side oil seal 171, and a gap between the output outer-diameter-side protrusion part 143 of the output part 140 and the holding outer-diameter-side protrusion part 153 of the stator holding part 150 on the outer diameter side is sealed by the outer-diameter-side oil seal 172. This prevents fluid, such as water, or solids, such as dust, from penetrating into the inside of the case 130 (inside space S) from the outside of the case 130 through the gap between the output part 140 and the stator holding part 150.

Then, in the motor 100 related to the exemplary embodiment, pressure adjustment inside the case 130 (inside space S) is performed via the ventilation member 200. Hereinafter, the ventilation member 200 will be described in detail.

[Configuration of Ventilation Member 200]

Figure 2:
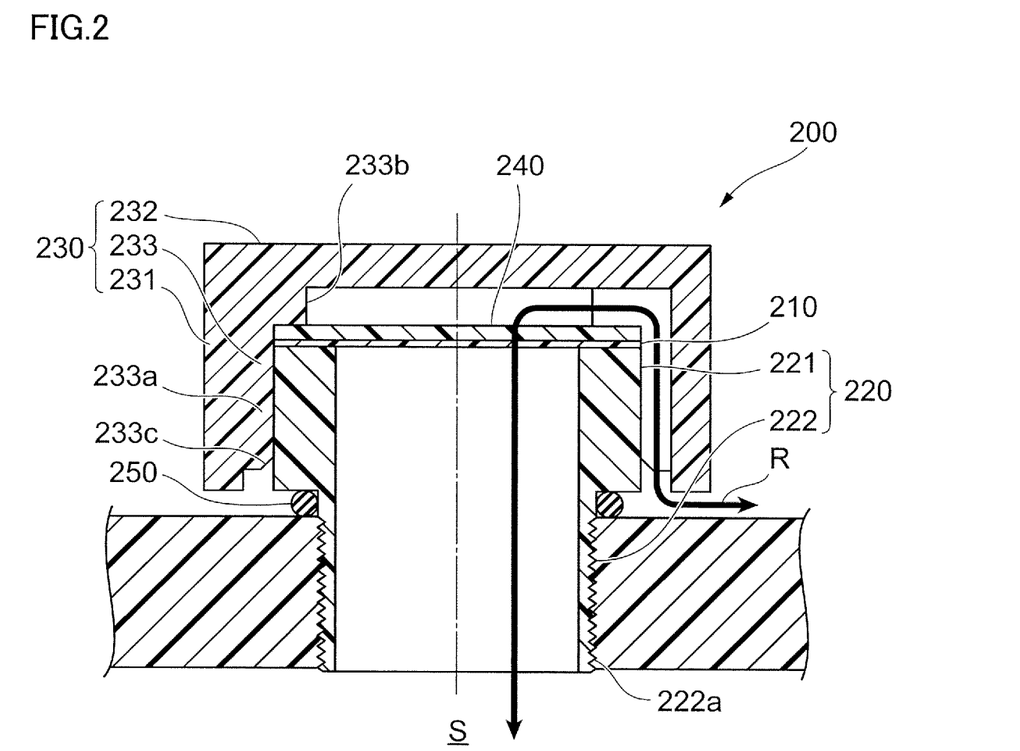
FIG. 2 is a cross-sectional view of a ventilation member.

FIG. 2 is a cross-sectional view of the ventilation member 200. Note that FIG. 2 shows the ventilation member 200 shown in FIG. 1 in the state being rotated 90 degrees in the counterclockwise direction.

The ventilation member 200 includes a ventilation membrane 210, as an example of a ventilation body having multiple pores formed therein that prevent fluid and solids from penetrating into the inside of the case 130 from the outside of the case 130 and permit flow of gas between the inside of the case 130 and the outside of the case 130.

Moreover, the ventilation member 200 includes: a support member 220, as an example of an attachment part, that supports the ventilation membrane 210; and a covering member 230 that covers around the ventilation membrane 210 to form a ventilation path R for flowing gas between thereof and the ventilation membrane 210.

Moreover, the ventilation member 200 includes: a protection member 240 that is arranged outside of the ventilation membrane 210 and prevents solids moving from the outside of the case 130 toward the inside of the case 130 from reaching the ventilation membrane 210; and an O ring 250 that seals between the support member 220 and the case 130.

<<Ventilation Membrane 210>>

The ventilation membrane 210 is a polytetrafluoroethylene (PTFE) porous membrane molded in a disk shape.

However, the material and the form of the ventilation membrane 210 are not particularly limited as long as a sufficient ventilation amount can be secured. As the material of the ventilation membrane 210, at least a kind selected from a fluorine resin porous body and a polyolefine porous body is preferable. As the fluorine resin, polytetrafluoroethylene (PTFE), polychlorotrifluoroethylene, tetrafluoroethylene-hexafluoropropylene copolymer, tetrafluoroethylene-perfluoroalkyl vinyl ether copolymer, tetrafluoroethylene-ethylene copolymer and so forth can be taken as examples. As monomers of polyolefine, ethylene, propylene, 4-methylpentene-1,1-butene and so forth can be taken as examples. Then, as the material of the ventilation membrane 210, polyolefine obtained by homopolymerizing or copolymerizing these monomers. Moreover, the material may be obtained by blending at least two kinds of polyolefine, or may be a layer structure of at least two kinds of polyolefine.

The ventilation membrane 210 related to the exemplary embodiment uses a PTFE porous membrane in view of the fact that a sufficient ventilation amount can be obtained even with a small area and high function of preventing water or dust from penetrating into the inside of the case 130 (the inside space S) is provided.

It can be taken as an example that the average pore diameter of pores formed in the ventilation membrane 210 is in the range from 0.01 μm or more to 100 μm or less. Among the range, the average pore diameter is preferably in the range from 0.1 μm or more to 50 μm or less, and more preferably, in the range from 0.5 μm or more to 10 μm or less.

When the average pore diameter formed in the ventilation membrane 210 is less than 0.01 μm, air is less likely to pass through the ventilation membrane 210. On the other hand, when the average pore diameter of the ventilation membrane 210 exceeds 100 μm, fluid or solids are likely to penetrate into the inside space S through the ventilation membrane 210.

The thickness of the ventilation membrane 210 is not particularly limited; however, it can be taken as an example that the thickness is in the range from 10 μm or more to 1000 μm or less.

When the thickness of the ventilation membrane 210 is excessively small, strength of the ventilation membrane 210 is likely to be reduced. On the other hand, when the thickness of the ventilation membrane 210 is excessively large, the size of the ventilation membrane 210 is likely to be increased.

It is preferable to apply liquid repellent treatment, such as water repellent treatment or oil repellent treatment to the surface of the ventilation membrane 210 (in particular, to an outside portion). By applying the liquid repellent treatment to the ventilation membrane 210, adhesion of contamination or the like to the ventilation membrane 210 is suppressed. As a result, clogging of the ventilation membrane 210 is suppressed.

The liquid repellent treatment for the ventilation membrane 210 can be performed by coating the surface of the ventilation membrane 210 with a liquid repellent agent, which has, for example, a compound including a hydrocarbon group saturated with fluoride (perfluoro-alkyl group) in a side chain and has a main chain of acrylic series, methacrylic series, silicone series or the like as a component. The method of coating the surface of the ventilation membrane 210 is not particularly limited; however, for example, gravure coating, spray coating, kiss coating, dipping or the like can be adopted.

<<Support Member 220>>

The support member 220 has a shape in which two cylinder-shaped parts having the same inner diameters and the different outer diameters are arranged in the centerline direction of the cylinder, and the support member 220 includes a first cylinder-shaped part 221 with a larger outer diameter and a second cylinder-shaped part 222 with a smaller outer diameter.

The support member 220 is attached to the case 130 while supporting the ventilation membrane 210, and the inside thereof functions as a part of the ventilation path R.

The ventilation membrane 210 is supported by an end surface on one side (on a side where the second cylinder-shaped part 222 is not arranged) in the centerline direction of the cylinder in the first cylinder-shaped part 221. The ventilation membrane 210 is arranged to close the opening portion of the support member 220. As the method of causing the ventilation membrane 210 to be supported by the first cylinder-shaped part 221, thermal welding or adhesion by a bonding agent can be exemplified.

A groove 222a in a spiral shape is formed on an outer circumferential surface of an end portion on the other side (on a side where the first cylinder-shaped part 221 is not arranged) in the centerline direction of the cylinder in the second cylinder-shaped part 222. By screwing the groove 222a formed on the second cylinder-shaped part 222 into the female thread 155 formed on the case 130, the ventilation member 200 is fastened to the case 130.

The O ring 250 is attached to the outer circumferential surface of an end portion on one side (on a side where the first cylinder-shaped part 221 is arranged) in the centerline direction of the cylinder in the second cylinder-shaped part 222. The O ring 250 seals the gap between the support member 220 and the case 130 by being pressed by an end surface on the other side in the centerline direction of the cylinder in the first cylinder-shaped part 221 and an outside portion in the case 130 and brought into contact with the outer circumferential surface of the second cylinder-shaped part 222, the end surface on the other side in the centerline direction of the cylinder in the first cylinder-shaped part 221 and the outside portion in the case 130.

The material of the support member 220 can be exemplified as a thermoplastic resin that is easily molded. For example, the material can be exemplified as polybutylene terephthalate (PBT), polyphenylene sulfide (PPS), polysulfone (PS), polypropylene (PP), polyethylene (PE), ABS resin, thermoplastic elastomer or a composite material thereof. Moreover, as the material of the support member 220, other than the above-described thermoplastic resins, a composite material made by combining a reinforcement, such as glass fiber or carbon fiber, or metal with the thermoplastic resin to improve heat resistance, dimensional stability, rigidity or the like may be used.

The molding method of the support member 220 is not particularly limited; for example, molding by injection molding or cutting can be exemplified.

<<Covering Member 230>>

The covering member 230 includes: a side wall part 231 substantially in a cylindrical shape; a top part 232 substantially in a disk shape that covers one of opening portions in the side wall part 231; and protrusions 233 that protrude in a plate-like shape inwardly from the inner circumferential surfaces of the side wall part 231 and the top part 232.

The protrusion 233 includes: a radial direction protrusion 233a that protrudes from the inner circumferential surface of the side wall part 231 toward (the inside of) the centerline of the cylinder; and a centerline direction protrusion 233b that protrudes from the inner circumferential surface of the top part 232 toward the centerline direction. The protrusions 233 are arranged at multiple locations (in the exemplary embodiment, 6 locations) in the circumferential direction at regular angle intervals.

The covering member 230 is held by the support member 220 by contact of inside end surfaces in the radial direction of the radial direction protrusions 233a of the multiple protrusions 233 with the outer circumferential surface of the first cylinder-shaped part 221 of the support member 220. In other words, molding is carried out so that the diameter of a circle formed by connecting the inside end surfaces in the radial direction of the radial direction protrusions 233a of the multiple protrusions 233 becomes smaller than the diameter of the outer circumferential surface of the first cylinder-shaped part 221 of the support member 220, and thereby the radial direction protrusions 233a of the multiple protrusions 233 tightly hold the outer circumferential surface of the first cylinder-shaped part 221 of the support member 220.

The covering member 230 is fitted over the support member 220 by being pressed toward the centerline direction from the opening portion side of the side wall part 231. Note that, to make it easy to fit the covering member 230 over the support member 220, a tapered part 233c is formed on the end portion on the opening portion side of the side wall part 231 in the radial direction protrusion 233*a* and inside in the radial direction.

The covering member 230 is pressed toward the centerline direction until the end surfaces in the centerline direction of the centerline direction protrusions 233*b* of the multiple protrusions 233 contact the protection member 240. The protection member 240 is held inside the covering member 230 by being sandwiched between the covering member 230 and the ventilation membrane 210.

Then, in the state of being held by the support member 220, the covering member 230 covers around the ventilation membrane 210 and the protection member 240, and also partially covers around the first cylinder-shaped part 221 of the support member 220.

The material of the covering member 230 is hard thermoplastic resin without rubber elasticity, such as polypropylene, polyethylene, polyethylene terephthalate, or ABS, for example. Moreover, the material of the covering member 230 may be thermoplastic elastomer having rubber elasticity.

Moreover, the covering member 230 is molded by injection molding, for example.

<<Protection Member 240>>

The protection member 240 is, as shown in FIG. 2, laminated on the outer (opposite to the inside space S) surface of the ventilation membrane 210. The material, structure and shape of the protection member 240 are not particularly limited as long as solids moving from the outside of the case 130 toward the inside of the case 130 are prevented from reaching the ventilation membrane 210; however, it is desirable that the protection member 240 has the pore diameter larger than that of the ventilation membrane 210 and is excellent in ventilating property. Then, an example can be shown in which the protection member 240 is cloth, resin or metal in a mesh shape or a fiber shape. For example, the protection member 240 may be a woven cloth, a non-woven cloth, a resin mesh, a net, a sponge, a metal porous body or a metal mesh. When heat resistance is required, it is preferable that the material of the protection member 240 is polyester, polyamide, aramid resin, polyimide, fluoride resin, ultrahigh molecular weight polyethylene, metal or the like.

The protection member 240 related to the exemplary embodiment is laminated on one surface of the ventilation membrane 210; however, the protection member 240 may be laminated on both surfaces of the ventilation membrane 210. Moreover, the protection member 240 may be joined or may not be joined to the ventilation membrane 210. When the protection member 240 is not joined to the ventilation membrane 210, the protection member 240 may be held inside the covering member 230 by being sandwiched between the covering member 230 and the ventilation membrane 210 or the support member 220.

<<Disposition of Ventilation Member 200>>

Figure 3:
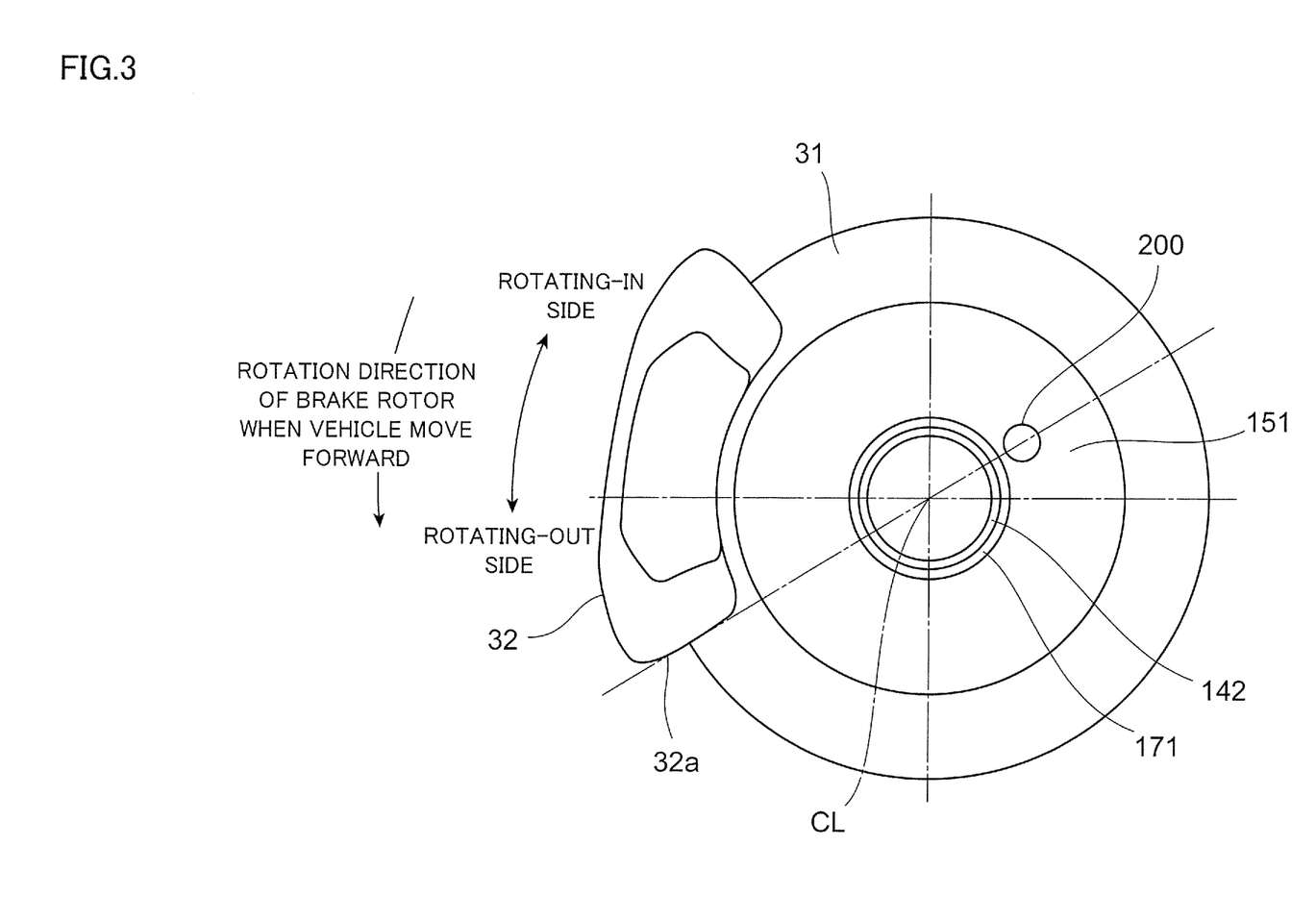
FIG. 3 is a diagram of the wheel drive device as viewed from a stator holding part of a case in an axial center direction.

FIG. 3 is a diagram of the wheel drive device 1 as viewed from the stator holding part 150 side of the case 130 in the direction of shaft center CL. Note that, in FIG. 3, the tire 10 or the wheel 20 are omitted.

The ventilation member 200 configured as described above is attached to the holding-side disk-shaped part 151 by being screwed into the female thread 155 formed in the holding-side disk-shaped part 151 of the stator holding part 150.

Since the ventilation member 200 is attached to the holding-side disk-shaped part 151 of the stator holding part 150, the ventilation member 200 is disposed on an opposite side of the output-side disk-shaped part 141 of the output part 140, to which the brake rotor 31 is attached, with respect to the inside space S in which the rotor 110 and the stator 120 are contained. In other words, the ventilation member 200 is away from the brake rotor 31 by a distance corresponding to the inside space S or more in the direction of shaft center CL.

Moreover, as shown in FIG. 3, the ventilation member 200 is disposed on an opposite side of the brake caliper 32 with respect to the shaft center CL. More specifically, the ventilation member 200 is disposed, in the circumferential direction around the shaft center CL, at a position shifted substantially by 180 degrees from the end part 32*a* on a rotating-out side in the circumferential direction in the brake caliper 32 when the vehicle moves forward.

<<Action and Effect of Ventilation Member 200>>

In the motor 100 configured as described above, when heat is generated by energization of the coil 122 of the stator 120 or friction caused by rotation of the rotor 110, the air inside the case 130 (the inside space S) expands. When the pressure inside the case 130 becomes higher relative to the pressure outside the case 130 by the expanded air, the air inside the case 130 is discharged to the outside of the case 130 through the ventilation member 200. Consequently, discharge of air from the lip part 171*a* of the inner-diameter-side oil seal 171 or the lip part 172*a* of the outer-diameter oil seal 172 is suppressed.

On the other hand, when energization of the coil 122 of the stator 120 or rotation of the rotor 110 is stopped and thereby action of the in-wheel motor 100 is stopped, the air inside the case 130 is in thermal equilibrium with the air outside the case 130. Then the air outside the case 130 is sucked into the inside of the case 130 through the ventilation member 200 by an amount discharged when the pressure inside the case 130 is increased.

When the air outside the case 130 is introduced to the inside of the case 130, the ventilation membrane 210 of the ventilation member 200 prevents fluid and solids from entering the inside of the case 130 from the outside of the case 130. Therefore, the ventilation member 200 prevents water, dust or others from penetrating the inside of the case 130.

Therefore, since the in-wheel motor 100 related to the exemplary embodiment includes the ventilation member 200, the in-wheel motor 100 is able to soften pressure fluctuations based on changes in temperature inside the case 130 and prevent penetration of fluid and solids to the inside of the case 130.

Then, by screwing the groove 222*a* formed on the second cylinder-shaped part 222 of the support member 220 that supports the ventilation membrane 210 into the female thread 155 formed in the through hole 151*b* of the case 130, the ventilation member 200 is fastened to the case 130. Therefore, the in-wheel motor 100 related to the exemplary embodiment is able to realize softening of pressure fluctuations based on changes in temperature inside the case 130 and prevention of penetration of fluid and solids to the inside of the case 130 with the simple configuration.

Moreover, since the ventilation member 200 related to the exemplary embodiment includes the protection member 240 outside the ventilation membrane 210, solids moving from the outside of the case 130 toward the inside of the case 130 are prevented from reaching the ventilation membrane 210. Therefore, the ventilation membrane 210 is prevented from being damaged by, for example, brake dust generated from the brake device 30. Moreover, since the ventilation member 200 includes the covering member 230 around the ventilation membrane 210 and the protection member 240, the fluid and the solids hardly reach the ventilation membrane 210. As a result, the ventilation member 200 related to the exemplary embodiment is able to fulfill a function of softening pressure fluctuations inside the case 130 and preventing fluid and solids from penetrating the inside of the case 130 over a long time.

Moreover, the ventilation member 200 related to the exemplary embodiment is attached to the inner diameter side (the shaft center CL side) in the holding-side disk-shaped part 151 of the stator holding part 150. In other words, the ventilation member 200 is farther away from a road surface than in the case where the ventilation member 200 is attached to the outer diameter side in the holding-side disk-shaped part 151 (the tire 10 side). Therefore, if there is muddy water on the road surface, the muddy water hardly reaches the ventilation member 200.

Here, it is considered that brake dust generated from the brake device 30 flies out mainly from the end part 32a on the rotating-out side in the circumferential direction in the brake caliper 32 when the vehicle moves forward (refer to FIG. 3) and flies toward the outer diameter side of the wheel 20 by a centrifugal force. On the other hand, the ventilation member 200 related to the exemplary embodiment is, of the output part 140 and the stator holding part 150 constituting the case 130, attached to the stator holding part 150 that is fastened (fastening-side case). Moreover, the attachment position is, in the circumferential direction around the shaft center CL, a position shifted substantially by 180 degrees from the end part 32a on the rotating-out side in the circumferential direction in the brake caliper 32. In this manner, since the ventilation member 200 is away from the end part 32a on the rotating-out side of the brake caliper 32 from which the brake dust flies out, the brake dust hardly reaches the ventilation member 200. Moreover, since the ventilation member 200 is attached to the stator holding part 150 that is fastened, the ventilation member 200 does not positively pass through the flying brake dust as compared to a case where the ventilation member 200 is attached to the output part 140 that is rotating; accordingly, the brake dust hardly reaches the ventilation member 200. As a result, since there is a low possibility that the ventilation membrane 210 is damaged or clogged by the brake dust, the ventilation member 200 can fulfill the above-described functions over a long time.

<Modified Example of Ventilation Member 200>

In the above-described exemplary embodiment, screwing the ventilation member 200 into the female thread 155 formed in the case 130 is shown as an example of the method of attaching the ventilation member 200 to the case 130; however, the method is not particularly limited thereto. For example, the ventilation member 200 may be attached to the case 130 by press fitting the support member 220 of the ventilation member 200 into the through hole 151b penetrating the inside of the case 130 (the inside space S) and the outside of the case 130.

Moreover, without the support of the ventilation membrane 210 by the support member 220, the ventilation membrane 210 may be applied, by bonding or the like, to the case 130 to close the through hole 151b formed in the case 130.

In the above-described exemplary embodiment, the attachment position of the ventilation member 200 is, in the circumferential direction around the shaft center CL, a position shifted substantially by 180 degrees from the end part 32a on the rotating-out side in the circumferential direction in the brake caliper 32; however, the attachment position is not particularly limited to such a position.

For example, as long as the brake dust generated from the brake device 30 mainly flies toward the outer diameter side and does not fly so much toward the inner diameter side or in the circumferential direction, the attachment position of the ventilation member 200 can be any position in the circumferential direction around the shaft center CL.

However, taking a possibility that the brake dust generated from the brake device 30 also flies toward the circumferential direction with the rotation of the wheel 20 after flying toward the outer diameter side into account, it is desirable that the attachment position of the ventilation member 200 in the circumferential direction around the shaft center CL is the at following position.

Figure 4:
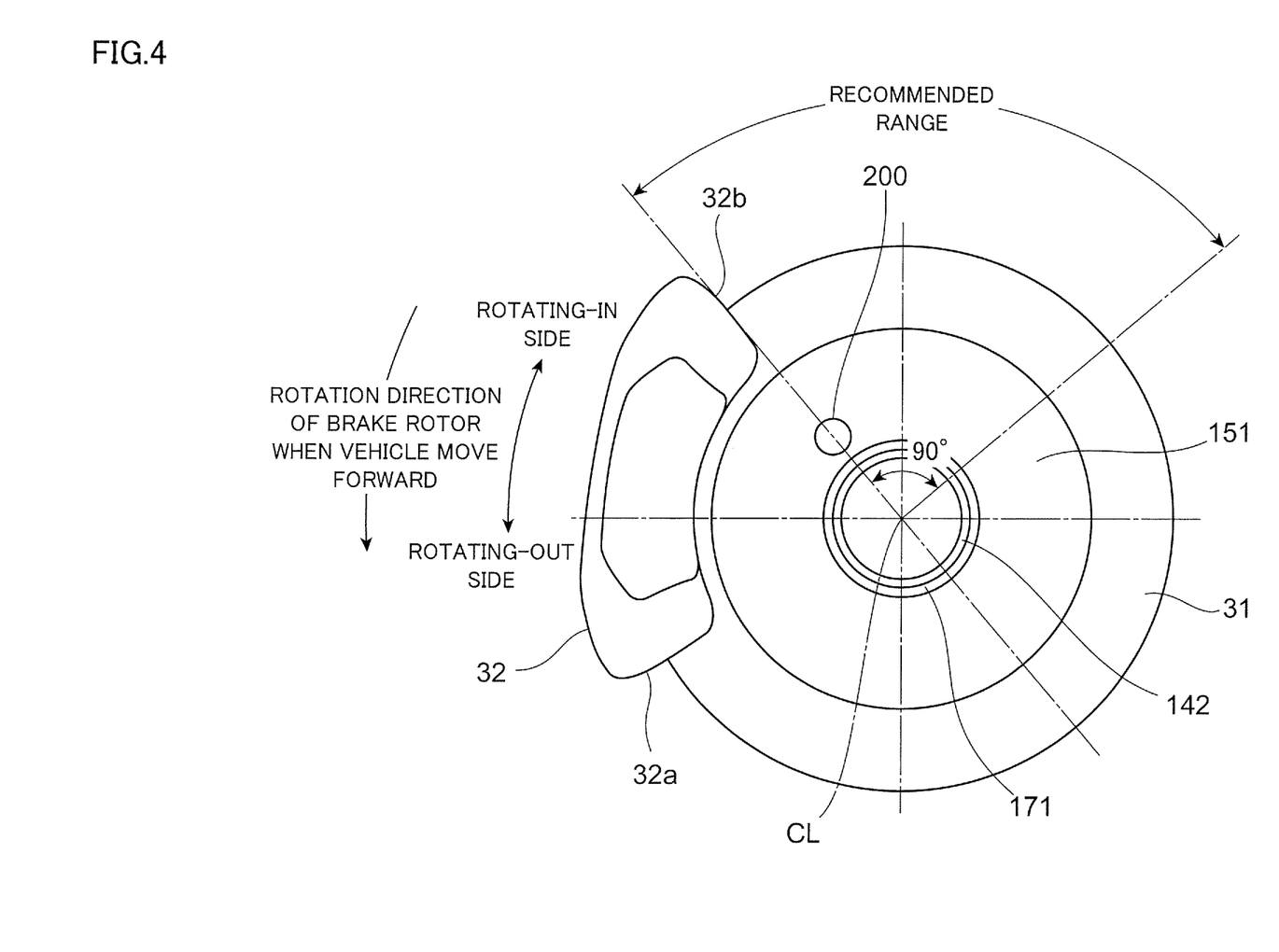
FIG. 4 is a diagram showing a modified example of an attachment position of the ventilation member.

FIG. 4 is a diagram showing a modified example of an attachment position of the ventilation member 200.

It is desirable that a shifting amount of the ventilation member 200 in the rotation direction of the brake rotor 31 when the vehicle moves forward from the end part 32a on the rotating-out side in the circumferential direction in the brake caliper 32 when the vehicle moves forward is larger. For example, it is desirable that, as shown in FIG. 4, the attachment position of the ventilation member 200 is on a line connecting an end part 32b on a rotating-in side in the circumferential direction in the brake caliper 32 when the vehicle moves forward and the shaft center CL. Moreover, the attachment position of the ventilation member 200 may be in a range from the end part 32b on the rotating-in side to 90 degrees in an opposite direction of the rotation direction of the brake rotor 31 when the vehicle moves forward (the recommended range shown in FIG. 4). This is because it is considered that, even if the brake dust generated from the brake device 30 flies toward the circumferential direction, the brake dust hardly reaches the recommended range.

Figure 5:
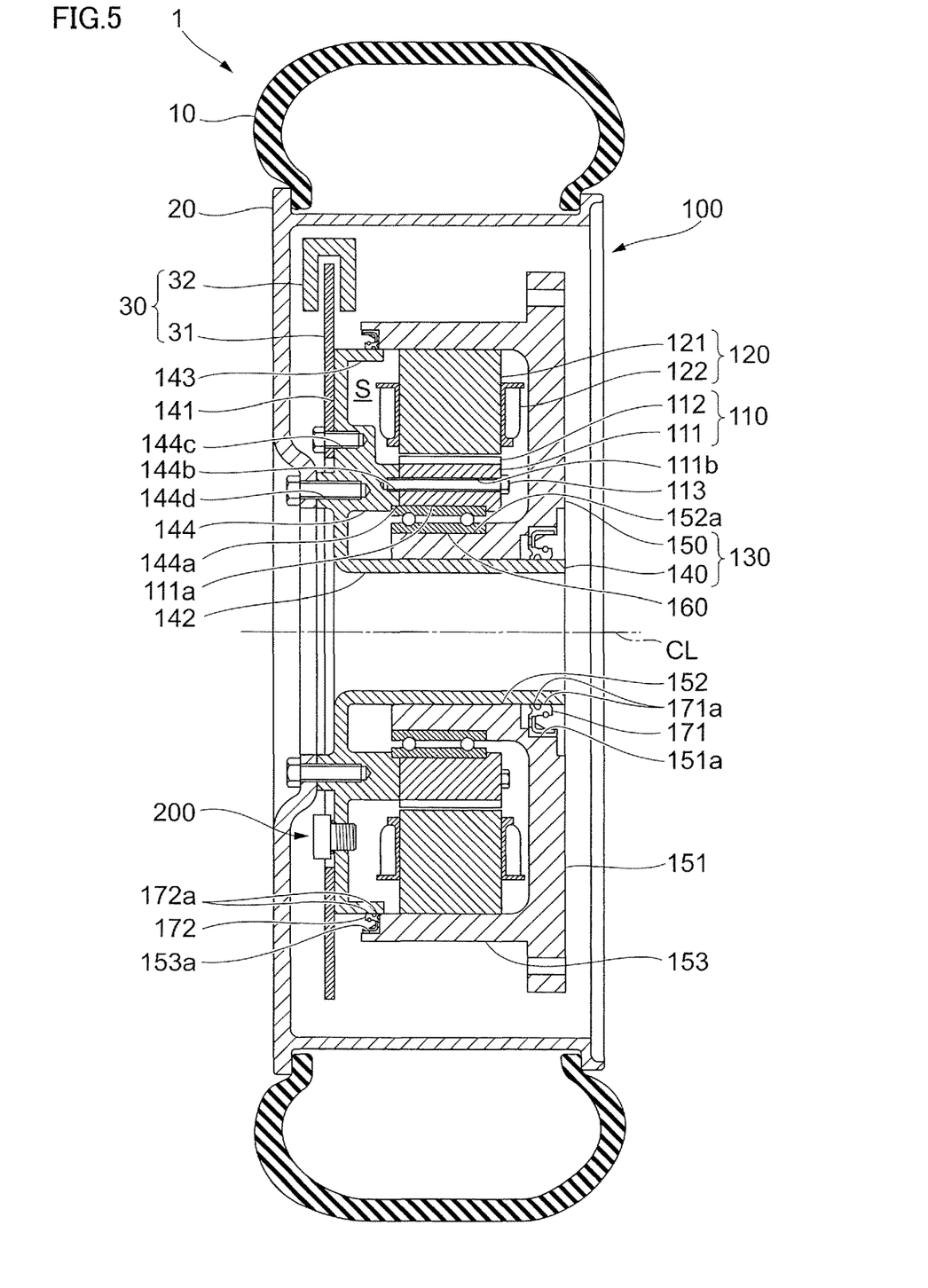
FIG. 5 is a diagram showing another modified example of the attachment position of the ventilation member.

FIG. 5 is a diagram showing another modified example of the attachment position of the ventilation member 200.

In the above-described exemplary embodiment, the ventilation member 200 is attached to, of the output part 140 and the stator holding part 150 constituting the case 130, the stator holding part 150 (the fastening-side case); however, the ventilation member 200 may be attached to the output part 140 (the rotating-side case). For example, as shown in FIG. 5, the ventilation member 200 may be attached to the output-side disk-shaped part 141 of the output part 140.

The ventilation member 200 is screwed into the output part 140, and is light-weight since being molded with a resin material or the like; therefore, even if a centrifugal force is applied to the ventilation member 200 by rotation of the output part 140, the ventilation member 200 hardly detaches from the output part 140. Moreover, even if the brake dust generated from the brake device 30 flies toward the outer diameter side, and thereafter also flies in the circumferential direction with the rotation of the wheel 20, the brake dust hardly reaches the ventilation member 200 disposed at the inner diameter side (the shaft center CL side) compared to the disposing position of the brake caliper 32. Therefore, even though the ventilation member 200 is attached to the output part 140, the ventilation member 200 is able to fulfill the above-described functions over a long time.

Note that, in the above-described exemplary embodiment, the wheel drive device 1 includes a single ventilation member 200; however, the number thereof is not limited to one, and multiple ventilation members 200 may be included. With the multiple ventilation members 200, even when one of the ventilation members 200 is damaged or clogged, since other ventilation members 200 fulfill the above-described function, the motor 100 is capable of preventing fluid and solids from penetrating the inside of the case 130 over a longer time.

Moreover, in the above-described exemplary embodiment, the ventilation member 200 is attached to the case 130 that contains the rotor 110 or the stator 120 as an example of a heat generation body that generates heat by rotation upon energizing the coil 122; however, the ventilation member 200 is able to fulfill the above-described function by being attached to a case containing other heat generation bodies.

It can be shown as an example that the other heat generation body is a parts group configured with gears or shafts to transmit power of a power source to a live axle while changing a torque, engine speed or rotation direction. By being attached to a transmission case that contains the parts group, the ventilation member 200 is able to soften pressure fluctuations inside the transmission case based on changes in temperature due to friction by the action of the parts group, and prevent penetration of fluid and solids to the inside of the transmission case.

In such a case, the transmission is an example of a drive device including: a parts group configured with gears or shafts as an example of a heat generation body that generates heat by operating; a transmission case that contains the parts group; and a ventilation membrane 210 that is attached to the transmission case and has multiple pores formed therein that prevent fluid and solids from penetrating inside of the transmission case from the outside of the transmission case and permit flow of gas between the inside and the outside.

REFERENCE SIGNS LIST

1 Wheel drive device
10 Tire
20 Wheel
30 Brake device
100 In-wheel motor
110 Rotor
120 Stator
130 Case
140 Output part
150 Stator holding part
200 Ventilation member
210 Ventilation membrane
220 Support member
230 Covering member
240 Protection member

The invention claimed is:
1. A drive device comprising:
a rotor and a stator of a motor;
a case containing the rotor and the stator, the case including a rotating-side case supporting the rotor and a fastening-side case supporting the stator;
a rotating plate disposed outside of the case and configured to rotate with a rotation of the rotor;
a stopping member configured to stop a rotation of the rotating plate by contacting the rotating plate; and
a ventilation body attached to the fastening-side case of the case and including a plurality of pores formed in the ventilation body configured to: (i) prevent a fluid and a solid from penetrating an inside of the case from an outside of the case, and (ii) permit flow of a gas between the inside of the case and the outside of the case.

2. The drive device according to claim 1, wherein the ventilation body is attached to an opposite side of the stopping member with respect to a rotation shaft of the rotor.

3. The drive device according to claim 1, wherein the ventilation body is a polytetrafluoroethylene porous membrane.

4. The drive device according to claim 3, further comprising a protection member disposed outside of the ventilation body and configured to prevent the solid from reaching the ventilation body, the solid moving from the outside of the case toward the inside of the case.

5. The drive device according to claim 4, further comprising:
a covering member disposed around the ventilation body forming a ventilation path to permit flow of a gas between the ventilation body and the covering member, wherein
the protection member is disposed between the ventilation body and the covering member.

6. The drive device according to claim 4, wherein the protection member is in a mesh shape or a fiber shape.

7. The drive device according to claim 1, further comprising a protection member disposed outside of the ventilation body and configured to prevent the solid from reaching the ventilation body, the solid moving from the outside of the case toward the inside of the case.

8. The drive device according to claim 7, further comprising:
a covering member disposed around the ventilation body forming a ventilation path to permit flow of the gas between the ventilation body and the covering member, wherein
the protection member is disposed between the ventilation body and the covering member.

9. The drive device according to claim 7, wherein the protection member is in a mesh shape or a fiber shape.

* * * * *